United States Patent [19]

Davis et al.

[11] 4,333,413

[45] Jun. 8, 1982

[54] TRANSVERSELY STIFFENED MEMBRANE SEAL

[75] Inventors: Sydney Davis, Silver Spring, Md.; Alexander Malakhoff, Arlington, Va.

[73] Assignee: The United States of America as represented by the Secretary of the Navy, Washington, D.C.

[21] Appl. No.: 114,455

[22] Filed: Jan. 23, 1980

[51] Int. Cl.$^3$ ................................................ B63B 1/38
[52] U.S. Cl. .................................... 114/67 A; 180/127
[58] Field of Search .................................. 180/126–127; 114/67 A

[56] References Cited

U.S. PATENT DOCUMENTS

| | | | |
|---|---|---|---|
| 3,166,137 | 1/1965 | Cooper | 180/127 |
| 3,291,237 | 12/1966 | Hopkins et al. | 180/127 |
| 3,379,271 | 4/1968 | Hopkins et al. | 180/127 X |
| 4,083,425 | 4/1978 | Rickards | 180/127 |
| 4,169,514 | 10/1979 | Wheeler et al. | 180/127 |

FOREIGN PATENT DOCUMENTS

| | | | |
|---|---|---|---|
| 2311157 | 9/1973 | Fed. Rep. of Germany | 180/127 |
| 1277884 | 6/1972 | United Kingdom | 180/127 |

Primary Examiner—Kathleen J. Prunner

Attorney, Agent, or Firm—R. F. Beers; L. A. Marsh; W. W. Randolph

[57] ABSTRACT

A seal structure for an air cushion vessel includes an inflatable bag secured to the hull and a transversely stiffened lobe portion maintained therebeneath. The stiffened lobe portion consists of a membrane with an array of spaced, transverse stiffener members connected thereto. The colinear stiffener members are interconnected in end-to-end relationship.

Generally, the end portions of the stiffener members are connected to support stays which are connected either to the bag structure or to the forward portion of the hull. The support stays may comprise cable elements or membranes which form continuations of the stiffened lobe membrane.

Additional support for the stiffened lobe portion is provided in the form of a plurality of rear support elements which set the orientation and configuration of the stiffened lobe portion and limit the downward deflection of the stiffened lobe portion. The rear support elements may comprise cables or membranes, which are supported from elongated bars, catenary cable supports, or cable elements.

10 Claims, 8 Drawing Figures

TRANSVERSELY STIFFENED MEMBRANE SEAL

The invention described herein may be manufactured and used by or for the Government of the United States of America for any governmental purposes without the payment of any royalties thereon or therefor.

BACKGROUND OF THE INVENTION

This invention generally relates to seal structures for Surface Effect Ships and more particularly to a seal structure which includes transverse reinforcing means for reducing weight requirements and the effects of impact loads.

Surface Effect Ships (SES) of the type referred to as Captured Air Bubble (CAB) vessels utilize a cushion of air contained within a plenum chamber beneath the vessel for supporting the vessel above the surface of the water. In marine CAB vessels the plenum chamber is commonly defined as a space between a pair of spaced, depending sidewalls with bow and stern seals extending athwartship between respective fore and aft end portions of the sidewalls. Problems associated with seal structures for CAB vessels include excessive loss of pressurized air from the plenum chamber adjacent the seals; high seal wear rates at the seal-water interface; structural problems caused by snap back and slamming loads of the seals; and high impact and drag forces due to nonresponsive and noncompliant seal structures. Although various types of seal structures, such as the planer, the bag and finger, and the bag and planer seal constructions, have been proposed to alleviate these problems, the additional strength and weight requirements for the new generation of large, high speed CAB vessels have precluded the use of many seal designs in such vessels. For example, large CAB vessels generally require large, lightweight and strong seal structures having rapid response characteristics to accommodate rapid variations in the water surface at high speeds. Also, the seal structures must be durable enough to endure impact and dynamic seal weight loads imposed thereon under severe sea state conditions.

It was found, for instance, that when many prior types of seal structures are scaled up to fit large CAB vessels, such seal designs become unduly heavy, ponderous and unresponsive in various sea state conditions. For example, although the planing seal disclosed in U.S. Pat. No. 3,532,180 granted to Ford and Wilson appears to be adequate for small vessels, it is difficult to scale the seal design up to the size required for large CAB vessels. The Ford seal structure includes a membrane and a plurality of flexible rods or spring steel strips incorporated therein for supporting the membrane. However, the rods or steel strips do not lend themselves to scaling up in size since they become much heavier and stiffer as their dimensions are increased, which accordingly reduces the responsive and planing characteristics of the seals.

An example of a proposed planing seal for large CAB vessels is disclosed in U.S. Pat. No. 4,137,987 granted to M. Plackett. The Plackett seal generally comprises a flexible bag structure secured between two spaced sidewalls and a planer seal portion of juxtaposed, elongated planer members connected to the hull and extending beneath the bag structure. The planers are maintained in operative position by a cooperative arrangement of support stays, which extend from the fore end portions of the planers to the hull, and retracting and geometry straps, which extend from the hull and are connected to the aft end of the planers. Thus, in operative position the elongated planers are designed to act as planer surfaces for riding over the water surface. A biasing or equilibrium means for causing the planers to return to a predetermined equilibrium position is provided by the bag structure which, upon inflation, exerts an outward pressure on the stay members. However, large scale seal structures utilizing the planers embodied in the Plackett patent have proved to be rather heavy and subject to severe slamming loads as the planers encounter the waves at high speeds, due to their weight and stiffness characteristics. The heavy weight of the planers also tends to cause the seal structure to be highly stressed under severe operating conditions such as "snap back." Snap back of the planers occurs after the lower portion of the seal is forced toward the hull by a wave which, after the wave passes the seal structure, causes a gap between the lower portion of the seal and the surface of the water. Under the influence of gravity and the cushion pressure, the planers accelerate toward the water until they are restrained or "snatched" by the flexible retracting and geometry support straps. Attempts to strengthen the planers with various reinforcing means has tended to reduce the flexibility and responsive characteristics of the planers which, accordingly, induces larger impact and drag forces on the seal structure.

SUMMARY OF THE INVENTION

The improved stiffened lobe seal structure for CAB vessels overcomes many drawbacks encountered with the prior art and includes an inflatable bag structure secured to the hull, between the vessel's sidewalls, and a transversely stiffened lobe portion depending from and secured beneath the bag. The lobe portion consists of a membrane with an array of laterally arranged, longitudinally spaced transverse stiffening means secured thereto. Each transverse stiffening means is preferably segmented into a plurality of lightweight elongated stiffener members interconnected in end-to-end relationship. Such a lightweight seal construction exhibits good wave compliance while reducing the effect of impact and drag forces acting thereon.

In one embodiment the adjacent, colinear stiffening members are pivotally interconnected at their longitudinal end portions. The end portions of the stiffener members are also adjustably connected to a plurality of support cables or stays which are secured to the hull and extend longitudinally between the sidewalls. Additional support means for the stiffener members is provided in the form of a plurality of positioning elements, which set the position of the seal structure, and adjusting straps, which limit the downward deflection of the stiffened lobes to a predetermined position. The positioning elements may be connected directly to the stiffeners, to the means interconnecting the stiffeners or to the support cables.

According to another preferred embodiment of the invention, the interconnected elongated stiffener members are uniformly supported along their longitudinal edge portions, wherein lightweight stiffener members are utilized to accommodate the bending moments and internal seal stresses transmitted thereto. Since the stiffener elements are relatively lightweight, as compared with stiffening means employed in the prior art, the support arrangement for the stiffener members is, accordingly, also relatively simple and lightweight. In one variation, the stiffener members are supported from the hull or the overlying bag structure by incorporating the spaced stiffener members into the membrane of the stiffened lobe portion. The support means for limiting the downward deflection of the stiffened seal lobe and setting the position of the lobe is also of simple and efficient design. For example, the stiffener elements may be supported along their longitudinal edge portions by additional support means comprising a diaphragm continuously secured thereto, a catenary cable support or a combination thereof.

More particular advantages of the lightweight, stiffened lobe construction include the economization of hull span structure and the reduction of the effect of impact and drag forces imposed on the seal. For example, because the stiffener and membrane elements are capable of deflecting along the longitudinal regions between adjacent stiffener members, only those portions of the stiffened lobe which are contacted by the waves tend to deflect and interact therewith. Thus, unlike planing seals which require rather long planing members to maintain a proper planing angle with the water surface, the overall seal structure can be designed to have a high angle of attack possibly as much as 60° to 70°, and to occupy a small section of the cushion space. Thus, unlike planing seals which require rather long planing members to maintain a proper planing angle with the water surface, the transversely stiffened seal structures can be designed to occupy a rather small amount of cushion space. Consequently, for a requisite cushion design length, utilization of a shorter hull section, which results in reduction of overall hull weight, is permitted with the transversely stiffened seals in comparison with other types of seal structures. Utilization of a lightweight, transversely stiffened seal design also reduces many of the stress effects acting thereon since, for example, the magnitude of the slam and snatch back forces generated in the seals is primarily a function of the weight of the seal structure.

Accordingly, a general object of the present invention is the provision of a lightweight seal structure for an air cushion vessel wherein the seal structure is capable of efficient operation under a variety of water surface or sea state conditions.

Another object of this invention is to provide a lightweight seal structure which is balanced by dynamic pressure loads to automatically adjust to variations in the contour of the supporting water surface and maintain good compliance therebetween.

A further object of the present invention is the provision of a simplified seal structure which permits efficient and smooth operation of the vessel at high speeds without causing undue impact and drag effects thereon.

Yet another object of the present invention is to provide an economically designed seal structure which has high flexibility and rapid response characteristics in a variety of sea state conditions.

BRIEF DESCRIPTION OF THE DRAWINGS

The novel features which are believed to be characteristic of this invention are set forth with particularly in the appended claims. The invention itself, however, both as to its organization and method of operation, together with further objects and advantages thereof, may be best understood by reference to the following description taken in conjunction with the accompanying drawings, in which:

DETAILED DESCRIPTION OF THE PREFERRED EMBODIMENT

Figure 1:
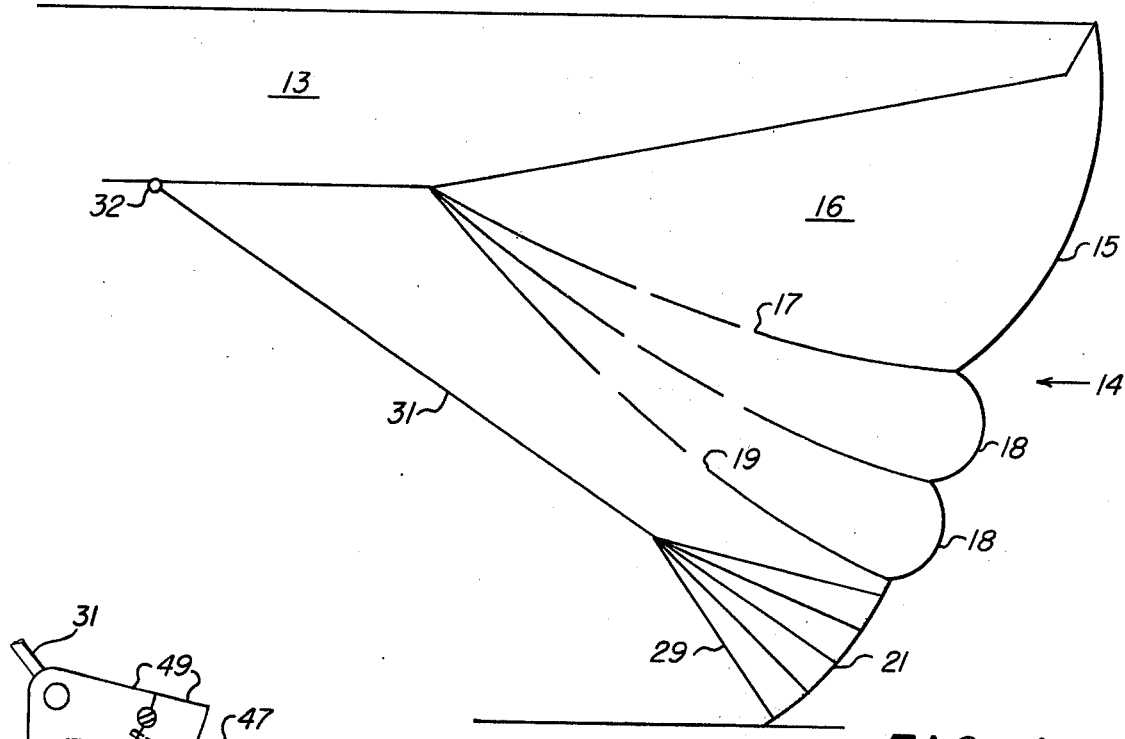
FIG. 1 is a diagrammatic side view of a seal structure having a stiffened lobe portion.
Figure 8:
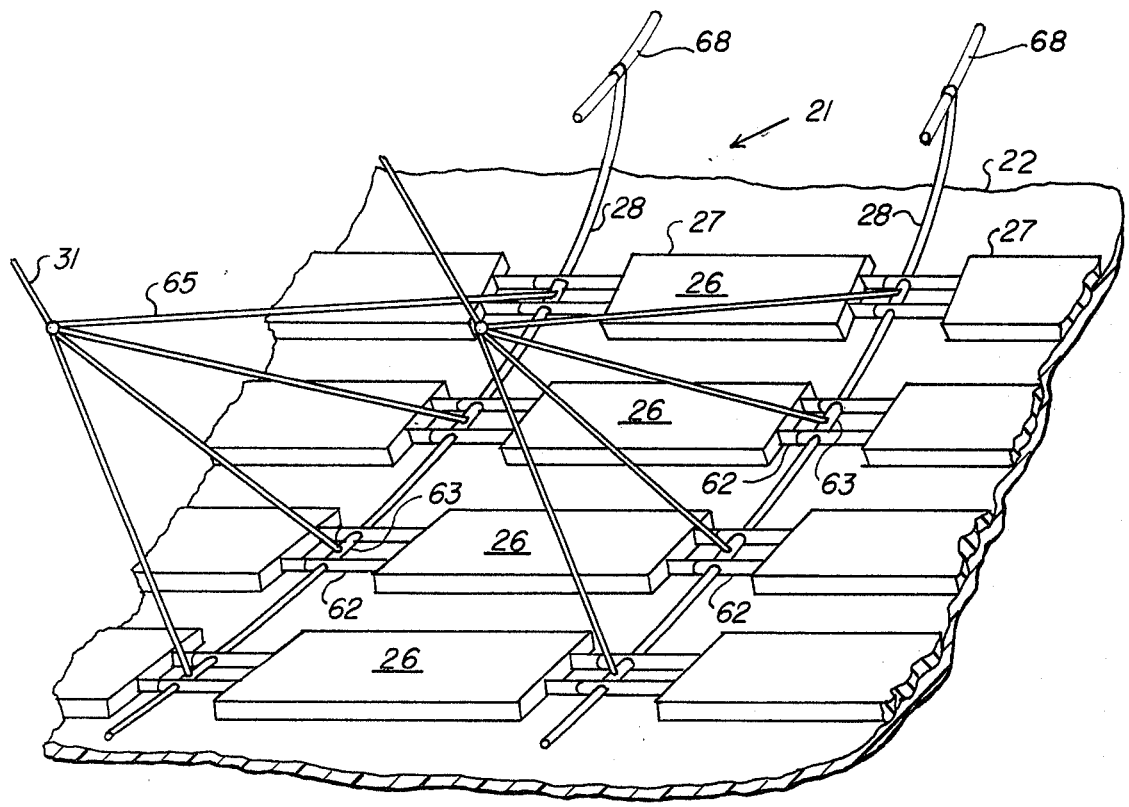
FIG. 8 is a perspective view of the stiffened lobe portion of FIG. 7.

Referring now to FIG. 1, there is shown a diagrammatic side view of a seal structure 14 which is particularly designed for the bow of an air cushion vehicle for sealing the forward end of the plenum chamber. The marine vessels which utilize the seal structure commonly include a hull section 13 with spaced rigid sidewalls depending from the hull and extending the length of the vessel. Bow and stern seals for the vessel are secured athwartship between the sidewalls to respectively seal the bow and stern portions of the plenum chamber. As shown in FIG. 1, the seal structure 14, hereinafter referred to as a stiffened lobe seal, includes an upper inflatable bag portion 15, a series of smaller bag segments 18 situated below the bag portion 15, and a lower stiffened lobe portion 21 positioned beneath the bag segments 18. Attached to the stiffened lobe portion 15 is a rearward support means in the form of a plurality of positioning elements 29 which not only provide support for the individual sections of the lobe portion 21 but also establish a predetermined operating configuration for the lobe portion 21. For example, under the influence of the cushion pressure, the lobe portion 21 is biased outwardly until the individual positioning elements 29 are fully extended. The positioning elements 29 are connected to adjustable retracting straps 31 which serve to orient the lobe portions 21 to accommodate a variety of sea state conditions. Adjustment of the retracting straps 31 is generally accomplished by rotating a rod means 32 which is attached to all of the retracting straps 31. Forward support means for the stiffened lobe portions 21 is provided by the membrane 22, as shown in FIG. 8, wherein additional support may be provided by support cables or stays 28 in FIG. 8.

Figure 6:
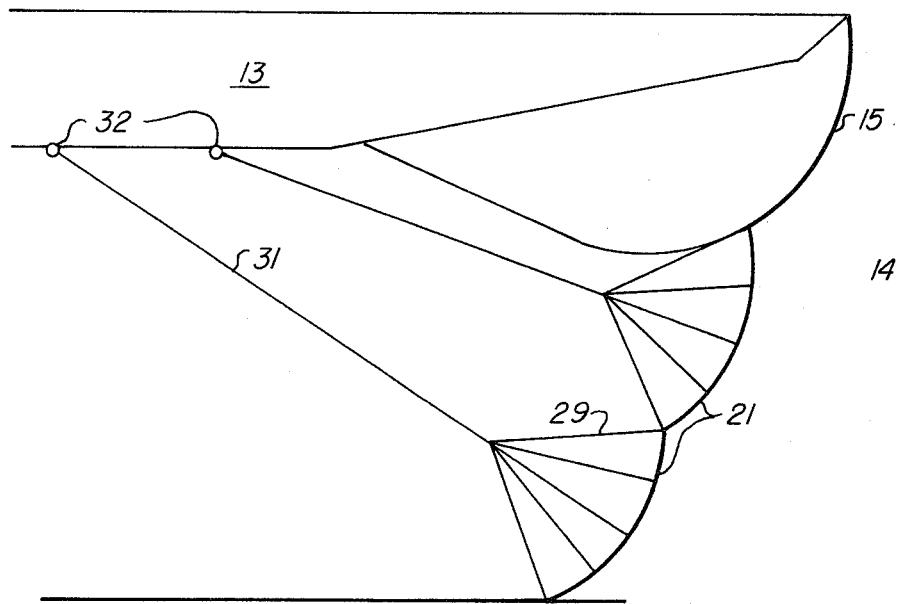
FIG. 6 is a diagrammatic side view of a seal structure having two stiffened lobe portions.

To maintain the bag structures 15 of FIG. 1 in an inflated, outwardly biased position, pressurized air is introduced into a chamber 16 defined by the undersurface of the hull 13 and the bag 15. Apertures 17 are provided in the bag material to permit the pressurized air to flow into the lobe chambers and eventually into the plenum chamber through vent passages 19. The dimensions of the apertures 17 and vent passages 19 are of a size to permit instantaneous venting of air from the respective chambers as the bag portion undergoes intermittent localized deformations due to the action of the waves. Thus, the bag structures 15 and 18 are able to absorb wave impact forces transmitted thereto and to function as a biasing means for maintaining the stiffened lobe portion 21 in a predetermined operative position beneath the bag structure 15. Further, since the stiffened lobe portions 21 are of a lightweight construction, a plurality of stiffened lobes 21 may be maintained beneath the bag 15, as shown in FIG. 6.

Figure 3:
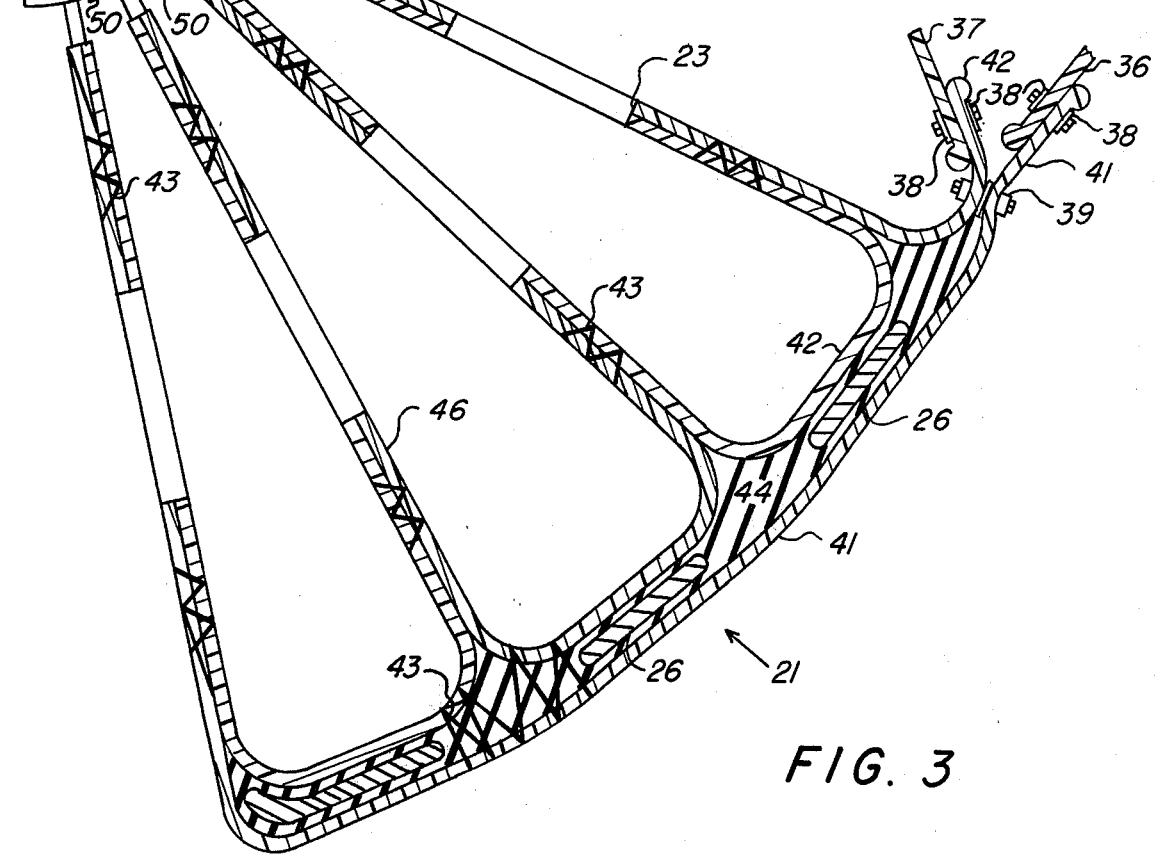
FIG. 3 is a sectional side view of the stiffened seal lobe portion of FIG. 2, taken generally along line 3—3.
Figure 2:
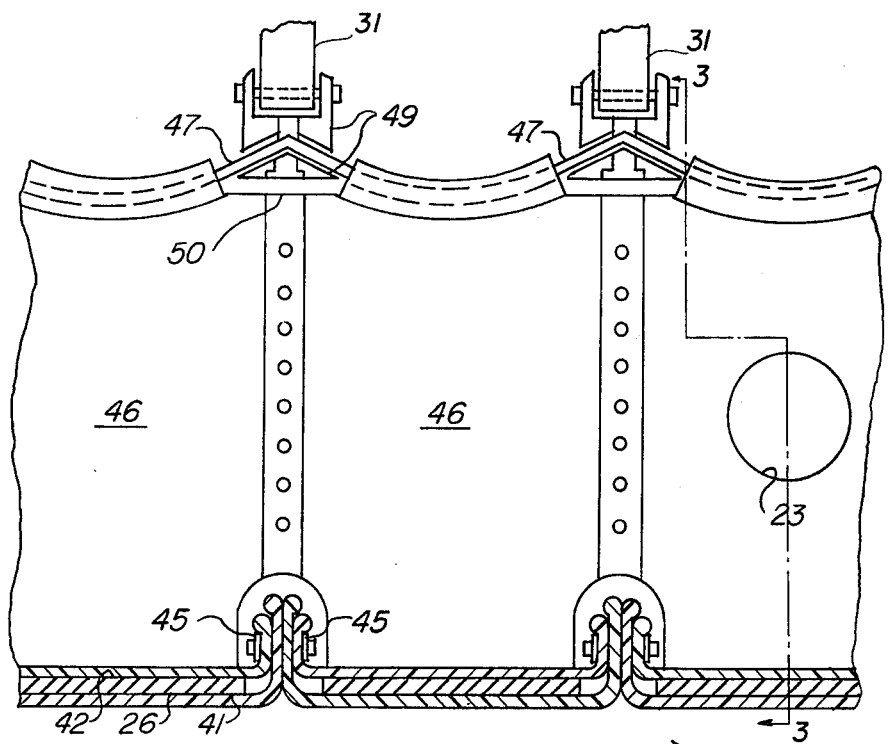
FIG. 2 is a sectional view of a variation of a stiffened lobe portion of a seal.
Figure 4:
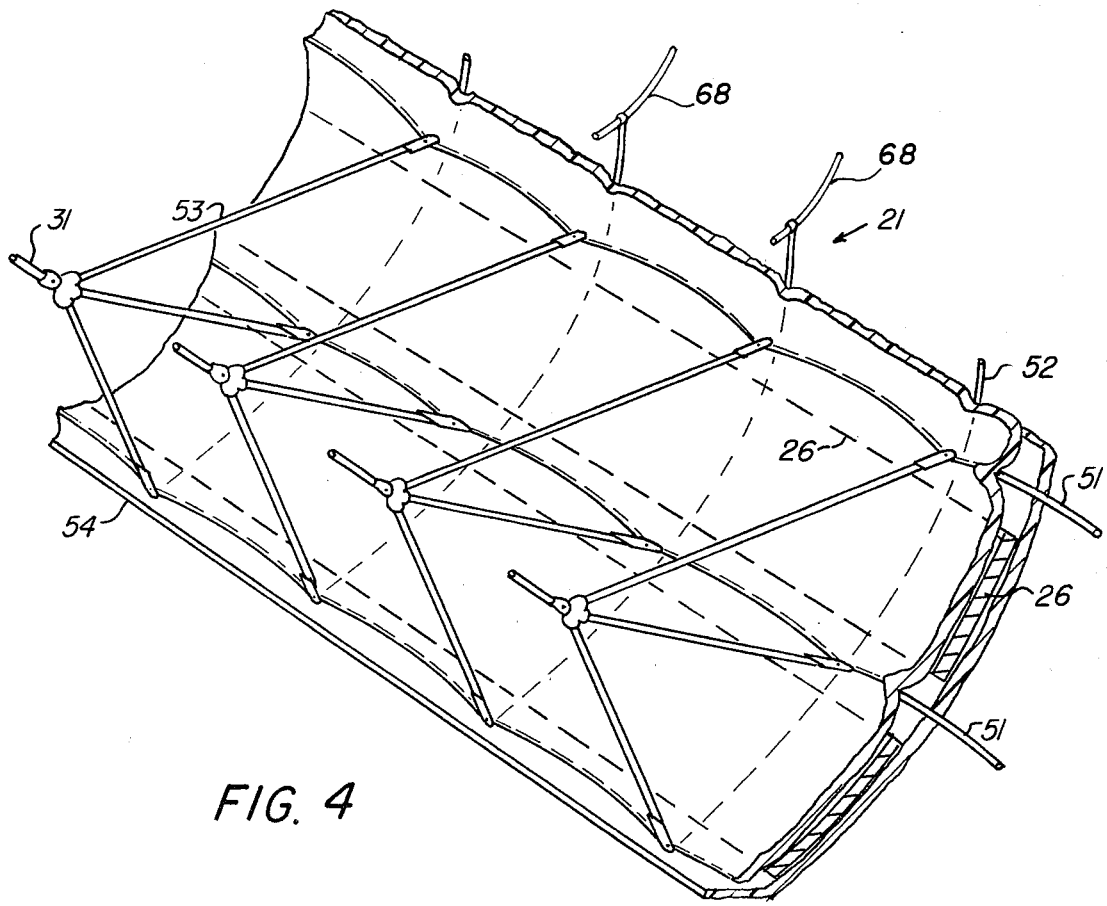
FIG. 4 is a perspective view of another variation of a stiffened seal lobe portion.
Figure 5:
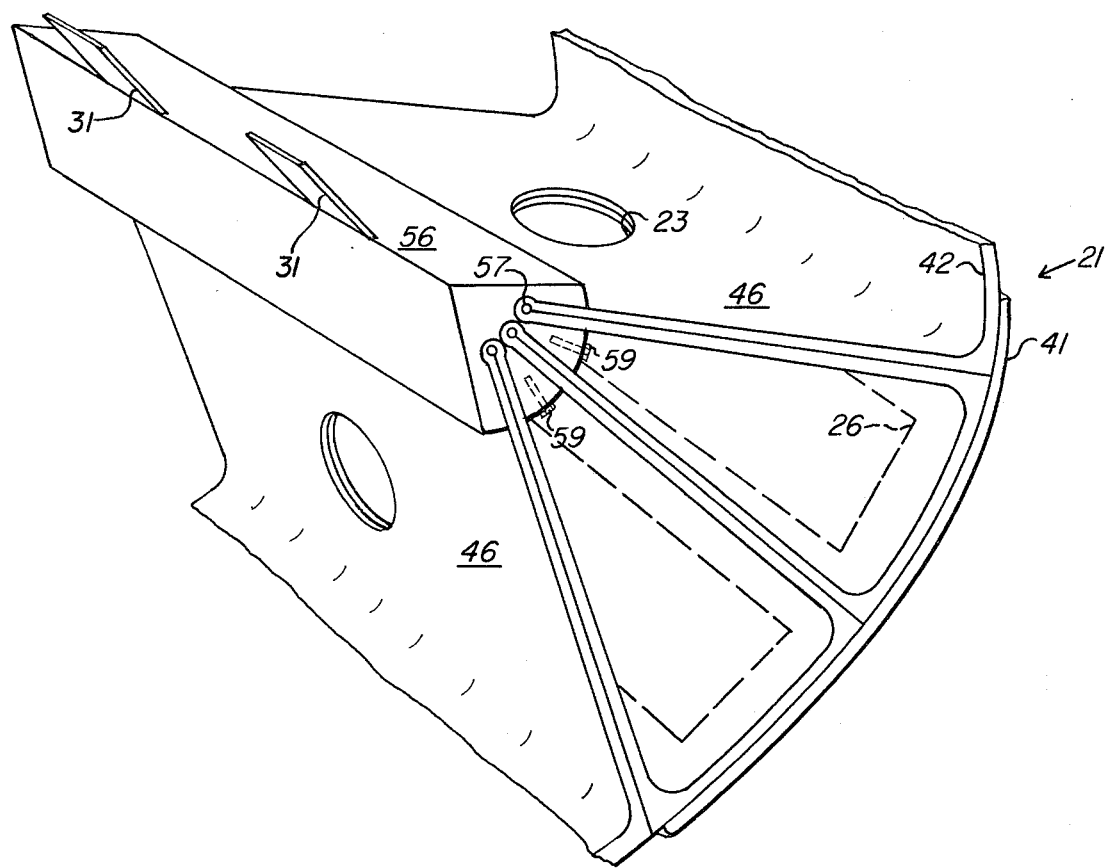
FIG. 5 is a perspective view of another variation of a stiffened seal lobe portion.

FIGS. 2-5 represent a stiffened lobe portion 21 wherein the transversely arranged stiffener members 26 are interposed between the materials forming the membrane of the lobe portion 21. More particularly, FIGS. 2 and 3 depict a variation wherein the means for supporting the stiffener members 26 comprise a forward membrane element 41 and a plurality of rear membrane elements 42 secured thereto. In FIG. 3, the front and rear membrane elements 41, 42, which may be formed of an elastomer coated fabric or a plastic material, are interconnected with stitching, represented by zig-zag lines 43. The stiffener members 26, which may be a fiberglass or a metallic material, are held in place between the membrane elements by the stitching 43 with a rubber or elastomeric material 44 filling the voids therebetween. The adjacent rear membrane elements 42 are also connected together with stitching 43, as shown in FIG. 3, to form positioning elements 29 comprising diaphragm type of supports 46 for the lobe portion 21. The stiffened lobe portions shown in FIGS. 2, 3 and 5 are maintained in an inflated position by a plurality of openings 23 provided in the diaphragms 46. A cable 47 is attached to the peripheral edge portions of each diaphragm 46 to form a catenary support therefore, as depicted in FIGS. 2 and 3, such that stresses transmitted to the lobe portion 21 are efficiently distributed to a plurality of clamping elements. The clamping elements comprise interfitting block portions 49 which are connected together with fastening means 50.

The type of stiffened seal lobe design of FIGS. 2 and 3, particularly facilitates a modular type of construction wherein membranes 22 of adjacent sections may be connected together to form the seal. As depicted in FIG. 2, the front and rear membranes 41, 42 of adjacent lobe portions are held together between a plurality of fastening plates 45 which are fastened together. The rear membranes 42 which comprise the diaphragm supports 46 are likewise held together with suitable fastening means, such as stitching 43.

FIG. 4 represents a further variation of the stiffened seal lobe construction wherein the lobe portion 21 includes an array of horizontal and vertical support stays 51, 52 encased between the front and rear membranes 41, 42. Like the stiffened lobe construction of FIGS. 2 and 3, transverse stiffeners 26 are secured between the membranes. However, instead of the catenary supported membranes utilized to provide support for the stiffened lobe portion 21 of FIGS. 2 and 3, the positioning elements comprise a plurality of cables 53. To provide additional seal-water interface, a reduced feather element 54 has been secured to the bottom edge of the lobe portion 21.

FIG. 5 represents a further modification of the stiffened seal lobe construction of FIGS. 2 and 3 wherein the rear membranes 42 which form the diaphragms 46 are secured to an elongated support bar 56. The distal end portions of the diaphragms are provided with a raised rib formed by inserting a cable 57 between opposed membranes, which is positioned in a conforming groove in the elongated support 56. Subsequently, locking pieces 59 are inserted into the elongated support 56 to maintain the ribs 57 in a fixed position. Like the bag structure, apertures 23 may be formed in the membranes 42 that form the diaphragms 46 of FIGS. 3 and 5 so that, to some extent, the stiffened lobe portions 21 of the seal essentially function as a plurality of small inflatable bag sections. Each stiffened lobe bag section being essentially defined by a stiffener element 26 and its associated support diaphragms 46, thus utilizes the cushion pressure to provide additional stiffness for the stiffened lobe portion of the seal.

Various means and arrangements may be utilized as a forward support means for supporting the stiffened lobe portion 21 beneath the hull section 13. In FIG. 3, for example, the front and rear membrane elements 41, 42 are supported from the membrane sections which respectively comprise forward 36 and rear 37 portions of an overlying bag structure 15. Like the connection means of FIG. 2, the joints are formed by clamping the respective membranes 36, 41 and 37, 42 between clamping plates 38 with various fastening means. To prevent separation of the front and rear membranes 41, 42 adjacent to the connection formed with the overlying bag structure, clamping plates 39 may also be utilized to prevent separation of the membrane. Further, in FIG. 4, the vertical stays 52 may be utilized to help support the stiffened lobe portion 21 beneath the overlying bag by connecting the vertical stays 52 to a series of cables 68 which follow the outline of the bag structure 15 and provide support therefore.

Figure 7:
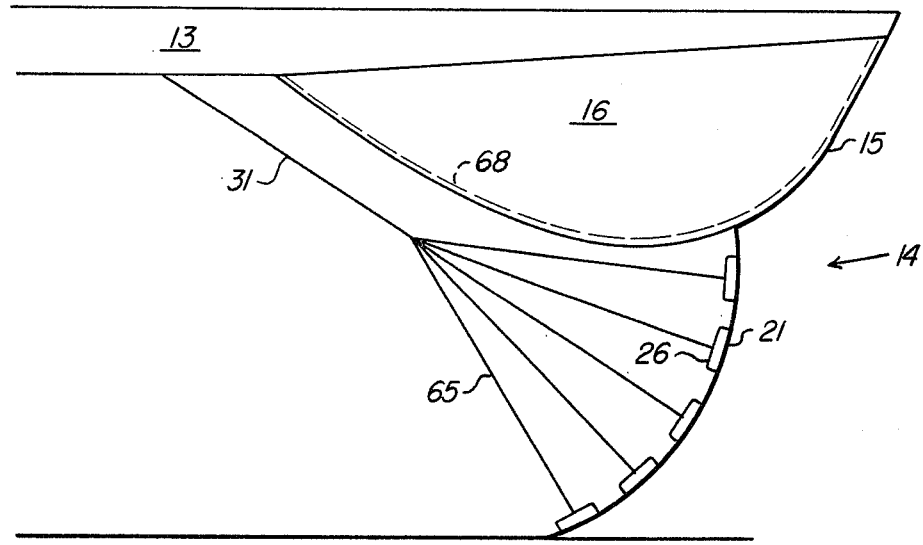
FIG. 7 is a diagrammatic side view of a seal structure wherein support means are connected to the transverse stiffeners.

In the embodiment of FIGS. 7 and 8, the elongated transverse stiffener members 26 are pivotally interconnected along their end portions 27 to permit a folding or pivoting action therebetween. As more particularly shown in FIG. 8, the means pivotally interconnecting the adjacent stiffeners comprise spaced flanges 62 projecting from the end portions 27 of the stiffeners and a tubular hinge members 63 passing through and pivotally interconnecting the flanges. The stiffeners 26 are also connected to a plurality of support cables or stays 28 which are connected to the hull and extend longitudinally between the vertical sidewalls of the vessel. In FIG. 8, the support cables or stays 28 pass through the tubular hinge members 63, which are provided with fastening means for allowing the hinge members 63 to be releasably secured to the stays 28.

Like the vertical cables of the stiffened lobe arrangement of FIG. 4, the stays 28 of FIG. 8, may be connected to a series of cables 68, as represented by dotted line 68 in FIG. 7, that are utilized to support the bag structure 15 and generally follow the outline thereof. Such an arrangement effectively utilizes the bag 15 and its accompanying support cables as a biasing means to maintain the stiffened lobe portion 21 of the seal 14 in a predetermined operating position.

Additional support means for the stiffeners 26 is provided by positioning elements in the form of a plurality of straps 65 which establish the operative configuration of the individual stiffener elements 26. These support straps 65 are connected to a retracting strap 31 which serves to establish the overall angular position of the stiffened lobe portion 21 in relation to the overlying structure and the surface of the waves. As more particularly shown in FIG. 8, the support straps 65 are connected to the tubular hinge members 63 so that stresses imposed on the stiffener members 26 by the waves are efficiently distributed to the stays 28 and support straps 65. The stiffener members 26 may be connected to the material forming the membrane 22 by a variety of fastening means.

Obviously many modifications and variations of the present invention are possible in light of the above teachings. It is therefore to be understood that within the scope of the appended claims, the invention may be practiced otherwise than as specifically described.

What is claimed is:

1. A seal structure for an air cushion marine vessel of the type having a hull with spaced, depending sidewalls for forming a plenum chamber therebetween comprises:
   a flexible bag secured to the hull and positioned between the sidewalls to form an expansible chamber, said bag being deformable in response to fluid pressures exerted thereon;
   a stiffened lobe portion positioned beneath said bag, said stiffened lobe portion including a membrane section and a plurality of elongated stiffener members connected to and extending transversely across said membrane section; and
   means connected to the hull for flexibly supporting said stiffened lobe portion beneath said bag,
   wherein said support means includes positioning elements connected to the longitudinal edge portions of said stiffener members and adjusting straps connected to the hull and said positioning elements for limiting the downward deflection of said stiffened lobe portion.

2. The seal structure according to claim 1, wherein said positioning elements include diaphragm portions extending between said stiffener members and said adjusting straps.

3. The seal structure according to claim 1, wherein said positioning elements include cables extending along and connected to said longitudinal edge portions of said stiffener members.

4. The seal structure according to claim 1, wherein said support means further includes means connecting said stiffened lobe portion to said bag.

5. The seal structure according to claim 4, wherein said connecting means comprises a plurality of spaced, elongated and flexible stays connected to said stiffened lobe portion and connected to means supporting said bag.

6. In an air cushion marine vessel of the type having an elongated hull with forward and rear end portions and with spaced depending sidewalls extending generally from the forward portion to the rear portion of the hull to define a plenum chamber therebetween, the improvement in a seal structure for the plenum chamber comprising:
   a stiffened lobe seal portion including a membrane section and a plurality of elongated stiffener members connected thereto and extending generally athwartship, transversely across the membrane section; and
   support means connected to the longitudinal edge portions of the stiffener members, the support means extending rearwardly of the stiffened lobe portion and connected to the hull of the vessel, and said support means includes positioning elements connected to the longitudinal edge portions of the stiffener members and adjusting straps connected to the hull and the positioning elements for limiting the downward deflection of the stiffened lobe portion.

7. The seal structure according to claim 6, wherein the positioning elements include diaphragm portions extending between the stiffener member and the adjusting straps.

8. The seal structure according to claim 7, further comprising an elongated support bar connected to the positioning elements, and the end portions of the adjusting straps remote from the hull are connected to the support bar in spaced relationship.

9. The seal structure according to claim 7, wherein the diaphragm portions include edge portions spaced from the stiffened lobe seal portion, and further comprising cables extending transversely across and secured to the spaced edge portions of the diaphragm portions, and clamping elements connected to the cables and the end portions of the adjusting straps that are remote from the hull.

10. In an air cushion marine vessel of the type having an elongated hull with forward and rear end portions and with spaced depending sidewalls extending generally from the forward portion to the rear portion of the hull to define a plenum chamber therebetween, the improvement in a seal structure for the plenum chamber comprising:
   a stiffened lobe seal portion including a membrane section and a plurality of elongated stiffener members connected thereto and extending generally athwartship, transversely across the membrane section; and
   support means connected to the longitudinal edge portions of the stiffener members, the support means extending rearwardly of the stiffened lobe portion and connected to the hull of the vessel, and the plurality of stiffener members are arranged in both end-to-end and spaced apart parallel relationship with each other.

* * * * *